United States Patent [19]
Williamson

[11] 4,179,928
[45] Dec. 25, 1979

[54] PUSH TYPE THERMAL DEVICE AND METHOD OF MAKING THE SAME AND A STEM SEAT THEREFOR AND METHOD OF MAKING THE SAME

[75] Inventor: Warren G. Williamson, Louisville, Tenn.

[73] Assignee: Robertshaw Controls Company, Richmond, Va.

[21] Appl. No.: 918,069

[22] Filed: Jun. 22, 1978

[51] Int. Cl.² ............................................. G01K 5/32
[52] U.S. Cl. ................................................... 73/368.3
[58] Field of Search ........................................ 73/368.3

[56] References Cited
U.S. PATENT DOCUMENTS

| | | | |
|---|---|---|---|
| 2,806,375 | 9/1957 | Wood | 73/368.3 |
| 3,046,787 | 7/1962 | Wagner | 73/368.3 |
| 3,719,085 | 3/1963 | Sliger | 73/368.3 |

Primary Examiner—S. Clement Swisher
Attorney, Agent, or Firm—Candor, Candor & Tassone

[57] ABSTRACT

A push type thermal device having a resilient stem seat provided with an opening in one end thereof and receiving an actuating stem therein that is adapted to reciprocate in a longitudinal direction in the opening in response to the thermal expansion and contraction of a charge of material in the device and only operatively acting on the other end of the stem seat in the aforementioned longitudinal direction, the stem seat having means for substantially preventing wadding of the stem seat during the stroking of the stem by the expansion of the charge of material.

48 Claims, 9 Drawing Figures

PUSH TYPE THERMAL DEVICE AND METHOD OF MAKING THE SAME AND A STEM SEAT THEREFOR AND METHOD OF MAKING THE SAME

BACKGROUND OF THE INVENTION

1. Field of the Invention

This invention relates to a push type thermal device and method of making the same as well as to a resilient stem seat for such a device and method of making the same.

2. Prior Art Statement

It is known to provide a push type thermal device having a resilient stem seat provided with an opening in one end thereof and receiving an actuating stem in the opening that is adapted to reciprocate in a longitudinal direction in the opening in response to the thermal expansion and contraction of a charge of material in the device and only operatively acting on the other end of the stem seat in the aforementioned longitudinal direction.

For example, see the following U.S. patent:

(1) U.S. Pat. No. 3,046,787—Wagner

It appears that the resilient stem seat of item (1) above has the diameter of the opening therein substantially the same as the diameter of the actuating stem being received therein except that a narrow section of the stem seat adjacent the open end of the opening has a reduced diameter through which the stem is press fitted to not only form a seal between the stem and the stem seat, but also between the stem seat and the casing carrying the same.

Another type of thermal device comprises a squeeze-push type wherein the resilient stem seat has a considerable length thereof radially surrounded by the charge of material which, when expanded, will squeeze the stem seat radially inwardly to squeeze and, thus, push the actuating stem in a longitudinal direction relative to the stem seat whereby the radial collapsing action of the stem seat for a squeeze-push type thermal device is completely different than just the longitudinal collapsing action of the stem seat for soley a push type thermal device.

For example, see the following U.S. Patent:

(2) U.S. Pat. No. 3,016,747—Vernet

It appears that the opening in the resilient stem seat has a diameter less than the outside diameter of the actuating stem so that the actuating stem must be press fitted in the opening of the stem seat substantially throughout the entire length thereof during the assembly of the stem within the stem seat.

Various means have been provided to tend to reduce rupture of the resilient stem seat of the squeeze-push type thermal device.

For showings of such improvements in the squeeze-push type of thermal elements, see the U.S. Patent to Vernet, No. 3,064,477; U.S. Patent to Baker, No. 3,080,756; U.S. Patent to Daly et al, No. 3,149,455; U.S. Patent to Winter, No. 3,420,105; and U.S. Patent to Dyhr-Mikkelsen, No. 3,832,850.

SUMMARY OF THE INVENTION

It was found that existing resilient stem seat designs for the push type of thermal power elements or devices are prone to rupture as the devices are cycled.

Accordingly, it is a feature of this invention to tend to reduce such rupture of the flexible stem seat for push type thermal devices.

In particular, it was found that prior stem seat designs each tend to rupture and, thus, fail because the same tend to wad as the respective device makes its power stroke, such wadding taking place in the resilient stem seat between the end thereof that is being acted upon by the thermally expanding charge of material of the device and the closed end of the opening that carries the actuating stem.

Accordingly, it is another feature of this invention to tend to prevent wadding of the resilient stem seat of a push type thermal device.

In particular, one embodiment of this invention provides a push type thermal device having a resilient stem seat provided with an opening in one end thereof and receiving an actuating stem in the opening that is adapted to reciprocate in a longitudinal direction in the opening in response to the thermal expansion and contraction of a charge of material in the device and only operatively acting on the end of the stem seat in the aforementioned longitudinal direction, the stem seat having means for substantially preventing wadding of the stem seat during the stroking of the stem by the expansion of the charge of material.

In one embodiment of this invention, such means of the stem seat provides the stem seat with a configuration thereof that initially has substantially the same length and outside shape between the ends thereof in its unassembled condition as the stem seat has when in the assembled and fully stroked condition thereof.

The opening in the resilient stem seat of this invention includes one portion thereof adjacent the charge end of the stem seat that is substantially smaller in diameter than the diameter of the stem when the stem seat is in the unassembled condition thereof.

Accordingly, it is an object of this invention to provide an improved push type thermal device having one or more of the novel features of this invention as set forth above or hereinafter shown or described.

Another object of this invention is to provide a method of making such a push type thermal device, the method of the invention having one or more of the novel features of this invention as set forth above or hereinafter shown or described.

Another object of this invention is to provide a resilient stem seat for a push type thermal device, the stem seat of this invention having one or more of the novel features of this invention as set forth above or hereinafter shown or described.

Another object of this invention is to provide a method of making such a resilient stem seat, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
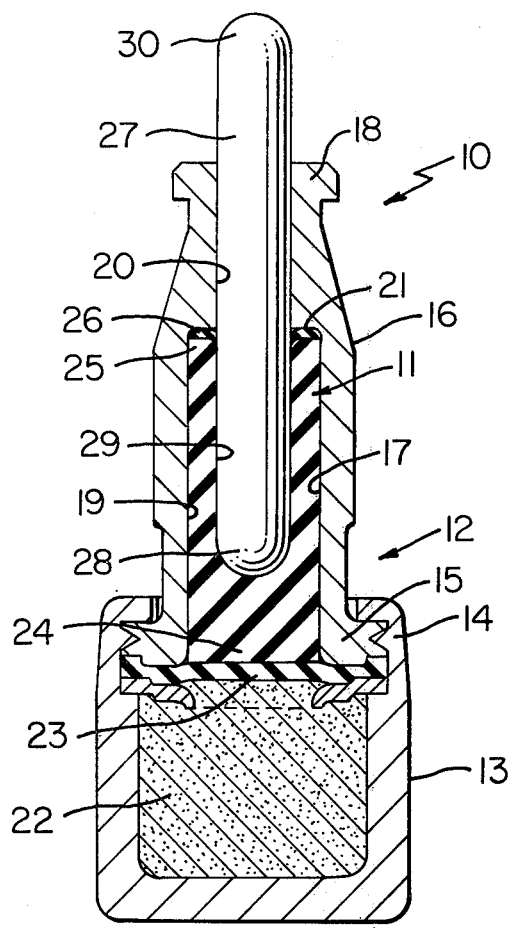
FIG. 1 is a cross-sectional view of the improved push type thermal device of this invention.

While the various features of this invention are hereinafter described and illustrated as being particularly adapted to provide a resilient stem seat for a thermal device, it is to be understood that the various features of this invention can be utilized singly or in any combination thereof to provide a resilient stem seat for other types of devices, as desired.

Therefore, this invention is not to be limited to only the embodiment illustrated in the drawings, because the drawings are merely utilized to illustrate one of the wide variety of uses of this invention.

Referring now to FIG. 1, the improved push type thermal device of this invention is generally indicated by the reference numeral 10 and is basically the same as the thermal device disclosed in the U.S. Patent to Sliger, No. 3,719,085 and the aforementioned U.S. Patent to Wagner, No. 3,046,787 except for the resilient stem seat 11 thereof which has the unique unassembled configuration illustrated in FIG. 3 for a purpose hereinafter described.

Thus, since the structure and operation of the thermal device 10 is well known in the art, it is only necessary to describe the parts of the thermal device 10 in a general manner in order to fully understand the features of this invention whereby the aforementioned U.S. Patent to Sliger and U.S. Patent to Wagner are incorporated into this disclosure by reference for the details of the structure and apparatus of a push type thermal device.

As illustrated in FIG. 1, the thermal device 10 includes a housing means that is generally indicated by the reference numeral 12 and comprises a cup-shaped metallic member 13 secured at its open end 14 to an end 15 of another metallic housing number 16 that has a stepped bore 17 passing completely through the opposed ends 15 and 18, the lower portion 19 of the stepped bore 17 being substantially cylindrical so as to define a cylindrical chamber 19 and being larger in diameter than the upper portion 20 of the stepped bore 17 so as to be joined thereto by an annular shoulder 21 of the housing member 16.

A conventional charge of thermally expandable and contractible material 22 is disposed in the cup 13 which carries a disc-like resilient diaphragm member 23 separating the charge of material 22 from the substantially cylindrical resilient stem seat 11 that substantially fills the portion or cylindrical chamber 19 of the bore 17 as illustrated, the stem seat 11 having its lower end 24 disposed against the disc-like diaphragm 23 while its upper end 25 is disposed against a seal member 26 held against the annular shoulder 21 of the housing member 16 as illustrated.

A metallic actuating stem 27 has its lower substantially hemispherical end 28 received in an opening 29 formed in the stem seat 11 and interrupting the upper end 25 thereof while terminating short of the lower end 24 thereof whereby the upper substantially hemispherical end 30 of the actuating stem 27 projects out of the upper portion 20 of the bore 17 to operate any desired structure, such as a valve means, etc., in a manner well known in the art.

When the charge of material 22 is heated to a certain temperature, depending upon the particular rating of the charge of material 22 being utilized in the device 10, the charge of material 22 expands and, thus, forces the disphragm 23 upwardly in FIG. 1 and thereby pushes on the end 24 of the stem seat 11 in a longitudinal direction to cause the same to force the actuating stem 27 longitudinally upwardly. Conversely, upon a subsequent cooling of the charge of material 22, the charge of material 22 contracts so that a force being imposed upon the upper end 30 of the stem 27 in the aforementioned longitudinal direction will cause the stem 27 to be longitudinally retracted back into the housing means 12 in a manner well known in the art.

Thus, when the stem 27 is in its fully retracted condition into the housing means 12, the device 10 is in its unstroked condition and when the stem 27 has been pushed out of the housing 12 to its fully extended condition, the device 10 is in its stroked condition as is well known in the art.

Figure 2:
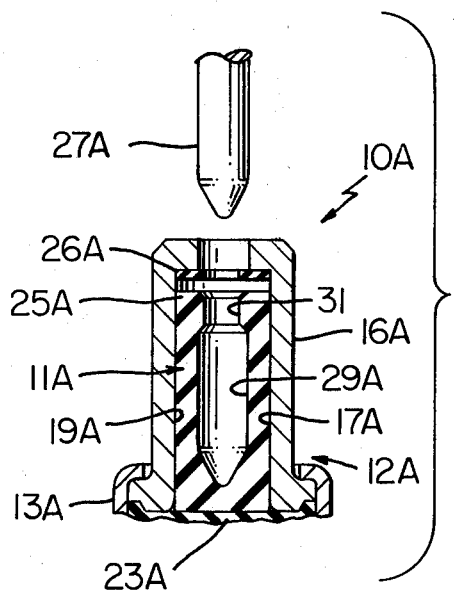
FIG. 2 is a fragmentary exploded view illustrating a prior art push type thermal device.

In order to understand the improved features of the resilient stem seat 11 of this invention, it is deemed best to first describe a presently utilized resilient stem seat design whereby reference is now made to FIG. 2 wherein a prior art push type thermal device is generally indicated by the reference numeral 10A and parts thereof similar to the device 10 previously described are indicated by like reference numerals followed by the reference letter "A".

The resilient stem seat 11A of FIG. 2 is fully disclosed and claimed in the aforementioned U.S. Patent to Wagner, No. 3,046,787 has the opening 29A formed therein with a diameter that is substantially the same as the diameter of the stem 27A except that an upper narrow portion 31 thereof adjacent the end 25A is reduced so as to cause a press-fit relation with the stem 27A when the same is inserted into the opening 29A through the upper end 25A thereof so that not only will the upper portion 25A of the resilient stem seat 11A be provided with a seal fit with the stem 27A, but also the upper end 25A will form a seal fit with the upper portion of the part 19A of the stepped bore 17A of the housing member 16A.

It can be seen that before the stem 27A is assembled into the opening 29A of the resilient stem seat 11A, the upper end 25A of the stem seat 11A is slightly spaced below the seal 26A so that the stem seat 11A can expand to completely fill the portion 19A of the stepped bore 17A when the stem 27A is press fitted through the reduced portion 31 of the stem seat 11A.

Nevertheless, when the stem 27A is fully inserted into the opening 29A of the stem seat 11A and the device 10A is in the unstroked condition thereof, the overall length of the stem seat 11A in its unstroked condition is substantially the same as the length of the molded condition of the stem seat 11A in its unassembled condition.

Figures 4, 5, 6:
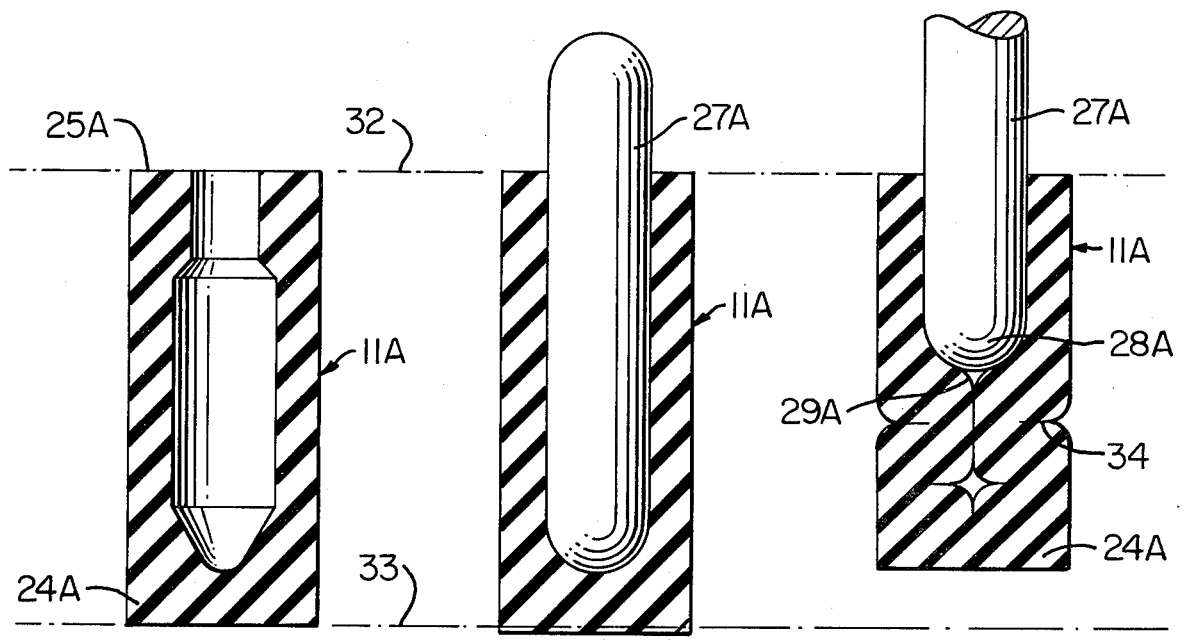
FIG. 4 is a view similar to FIG. 3 and illustrates the prior art stem seat of FIG. 2 in the unassembled condition thereof.
FIG. 5 is a view similar to FIG. 4 and illustrates the prior art stem seat assembled with the actuating stem therefor.
FIG. 6 is a view similar to FIG. 5 and illustrates the prior art assembled stem and stem seat in the stroked condition thereof.

For example, reference is now made to FIGS. 4, 5 and 6 wherein the prior art stem seat 11A is illustrated in FIG. 4 in its unassembled condition and has its upper end 25A disposed adjacent a horizontally disposed dashed line 32 while its lower end 24A is disposed adjacent another horizontally disposed dashed line 33, the lines 32 and 33 being respectively extended to project through FIGS. 5 and 6 as illustrated and for a comparison purpose hereinafter described.

FIG. 5 illustrates the prior art resilient stem seat 11A together with its assembled actuating stem 27A in the condition that the same would appear in their unstroked condition in the device 10A of FIG. 2 previously described whereby it can be seen that the overall length of the assembled and unstroked resilient stem seat 11A is substantially the same as the overall length of the stem seat 11A when in its unassembled condition as illustrated in FIG. 4.

It has been found according to the teachings of this invention that when the device 10A is fully assembled and has the charge of material 22A thereof heated to its fully expanded condition so that the diaphragm disc 23A has pushed longitudinally upwardly on the end 24A of the stem seat 11A to longitudinally force the stem 27A to its fully stroked condition, the lower portion 24A of such stroked stem seat 11A will basically have the configuration illustrated in FIG. 6 wherein the stem seat 11A has been wadded and wrinkled to fill the void created in the opening 29A and from which the lower end 28A of the stem 27A has been pushed outwardly to its fully extended or stroked condition as illustrated in FIG. 6.

In the fully stroked condition of the prior art stem seat 11A, it can be seen that the lower end 24A is now substantially spaced above the lower line 33 illustrated in FIGS. 4, 5 and 6 and it is believed that because of such reduction in the overall length of the stem seat 11A, as well as the configuration of the opening 29A thereof, that the wrinkle lines 34 that are formed in the stem seat 11A tend to weaken the stem seat 11A so that after a certain amount of cycling of the stem seat 11A between the stroked condition of FIG. 6 and the unstroked condition of FIG. 5 thereof, rupture of the stem seat 11A will be found to take place.

Therefore, as previously stated, it is a feature of this invention to prevent the wadded and/or wrinkled condition of the resilient stem seat of a push type thermal element in its stroked condition to thereby tend to prevent subsequent rupture of such stem seat through the cycling thereof between the stroked and unstroked conditions thereof.

This feature is accomplished by making or molding the resilient stem seat 11 of this invention with a length and outside shape, as provided by the opening 29 thereof, which will be substantially the same as an installed stem seat 11 which is in the stroked condition whereas, in contrast, it can readily be seen in FIG. 5 that the prior art stem seat 11A is made or molded with a length and inside shape which are roughly the same as the shape of an installed stem seat 11A in the unstroked condition thereof.

In this manner, the opening 29 in the stem seat 11 of this invention provides the stem seat 11 with means for substantially preventing wadding of the stem seat 11 during the stroking of the stem seat 11 by the expansion of the charge of material 22 operatively acting on the end 24 of the stem seat 11 in a longitudinal direction. Thus, the opening 29 in the stem seat 11 provides the stem seat 11 with a configuration thereof that initially has substantially the same length and outside shape between the ends 24 and 25 thereof in the unassembled condition thereof that the same has when in the fully stroked condition thereof, such feature being provided by the configuration of the opening 29 in the stem seat 11 when the stem seat 11 is in the unassembled condition thereof.

Figures 7, 8, 9:
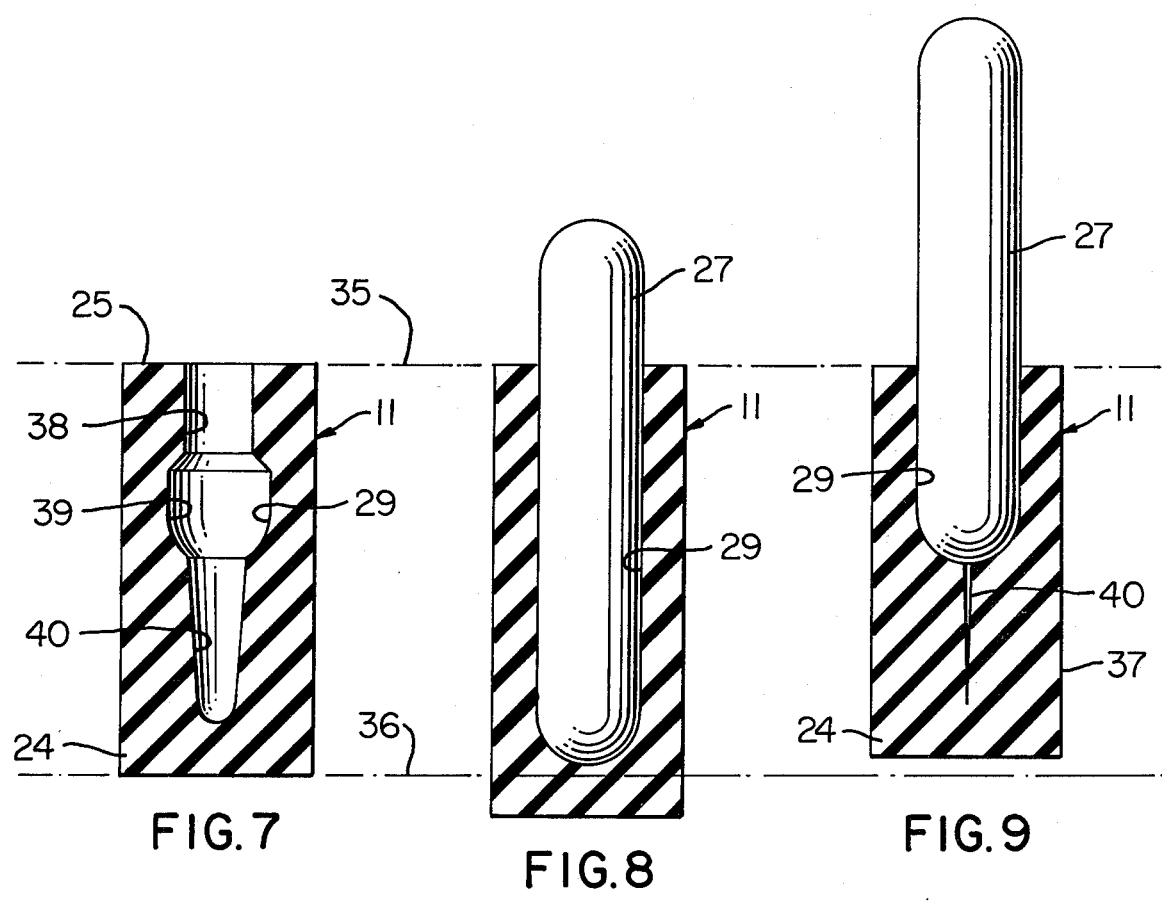
FIG. 7 is a reduced view of the improved stem seat of this invention in the unassembled condition thereof.
FIG. 8 is a view similar to FIG. 7 and illustrates the stem seat of this invention in its assembled condition with its actuating stem.
FIG. 9 is a view similar to FIG. 8 and illustrates the assembled stem and stem seat of this invention in their stroked condition.

In general, the improved resilient stem seat 11 of this invention, while being formed of the same rubber or other suitable material as the prior art stem seat 11A and having substantially the same outside diameter as the stem seat 11A, has a reduced length therefrom, and as illustrated in FIG. 7, the length of the stem seat 11 of this invention in its unassembled condition has its upper end 25 disposed at the horizontally disposed dashed line 35 while its lower end 24 is disposed at the horizontally disposed dashed line 36.

The lines 35 and 36 extend through FIGS. 8 and 9, FIG. 8 illustrating the stem seat 11 of this invention in its unstroked and assembled condition with the actuating stem 27, while FIG. 9 illustrates the assembled stem seat 11 in its fully stroked condition whereby it can be seen that no wadding or wrinkling of the lower end 24 thereof takes place and the outer peripheral and cylindrical surface 37 of the stem seat 11 remains smooth and continuous throughout its entire length. Also, the overall length of the stem seat 11 in its assembled and fully stroked condition is substantially the same as the unassembled stem seat illustrated in FIG. 7.

Thus, it can be seen that the stem seat 11 of this invention has an unassembled length and outside shape that is substantially the same as the length and outside shape of the stem seat 11 in the fully stroked condition of the device 10 when the stem seat 11 is in the assembled condition thereof in the chamber 19, the stem seat 11 thereby having a substantially smooth and continuous cylindrical side wall in its stroked condition and its unstroked condition as illustrated respectively in FIGS. 9 and 7.

Figure 3:
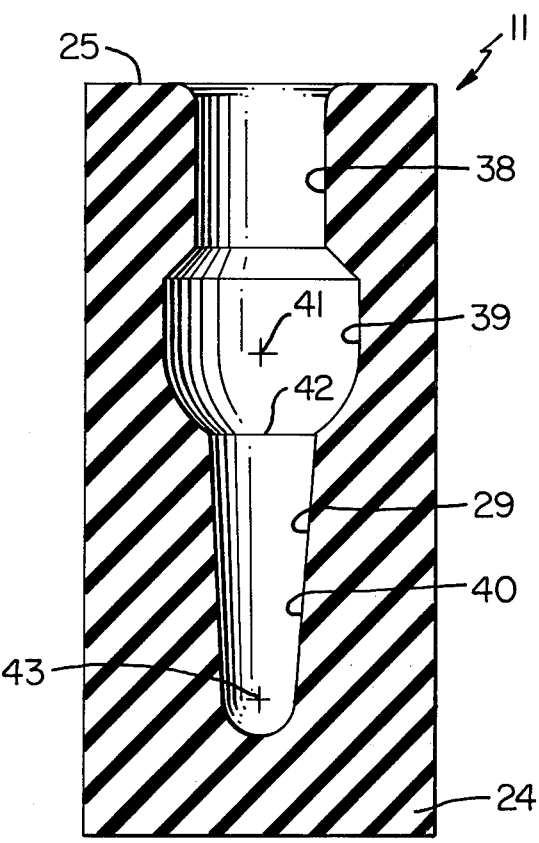
FIG. 3 is an enlarged cross-sectional view illustrating the improved flexible stem seat of this invention.

As previously stated, it is believed that the reason for the stem seat 11 being substantially the same in overall length in its unassembled condition and in its fully stroked and assembled conditioned is because of the configuration of the opening 29 thereof which is uniquely formed and is best illustrated in FIG. 3.

In particular, it can be seen that the opening 29 has three portions or sections 38, 39 and 40 with the portion 38 being substantially for the same purpose and formed in the same manner as the portion 31 of the stem seat 11A previously described while the portion 40 is substantially reduced in diameter and conical and the intermediate portion 39 is substantially cup-shaped and with a larger diameter than the diameter of either outboard portion 38 and 40 as will be apparent hereinafter.

Because the concial portion 40 of the opening 29 of the resilient stem seat 11 of this invention is substantially smaller in diameter than the diameter of the actuating stem 27 and is of the configuration illustrated in FIG. 3, the portion 40 of the opening 29 closes in a smooth manner as illustrated in FIG. 9 during the stroking of the assembled seat 11 and permits the overall length of the seat 11 in its assembled and stroked condition to be only slightly shorter than the length of the stem seat 11 in the unassembled condition as illustrated in FIG. 7.

In contrast, when the stem 27 is assembled to the stem seat 11 in its unstroked condition as illustrated in FIG. 8, it can be seen that the same stretches the length of the stem seat 11A considerably below the line 36 to fill the portion 19 of the stepped bore 17 of the housing member 16 whereby the stem seat 11 in its assembled and unstroked condition is subjected to axial and hoop tensile stresses which will relax as the device 10 makes its power stroke.

However, in the prior art device 10A, the stem seat 11A is subjected to destructive wadding and compressive stresses as the device 10A makes its power stroke.

Thus, it can be seen that the configuration of the opening 29 in the stem seat 11, when the stem seat 11 is in the unassembled condition thereof, includes one portion 40 thereof adjacent the end 24 of the stem seat 11 that is substantially smaller in diameter than the diameter of the actuating stem 27 when the stem seat 11 is in the unassembled condition thereof. The configuration of the opening 29 further includes another portion 38 thereof adjacent the end 25 of the stem seat 11 that is substantially smaller in diameter than the diameter of the actuating stem 27 when the stem seat 11 is in the unassembled condition thereof, the configuration of the opening 29 further including an intermediate portion 39 of the opening 29 that joins with the portion 40 and the portion 38 and has a diameter that is substantially the same as the diameter of the actuating stem 27 when the stem seat 11 is in the unassembled condition thereof. The portion 40 of the opening 29 is substantially conical in configuration with the apex thereof adjacent the end 24 of the stem seat 11. Such apex is substantially hemispherical in configuration when the stem seat 11 is in the unassembled condition thereof. The portion 38 of the opening 29 is substantially cylindrical in configuration when the stem seat is in the unassembled condition thereof. The intermediate portion 39 of the opening 29 is substantially cup-shaped in configuration with a larger end thereof joining with the portion 39 and a smaller end thereof joining with the portion 40 when the stem seat 11 is in the unassembled condition thereof. And, it can be seen that the length of the portion 40 of the opening 29 is substantially the same as the combined lengths of the upper portion 38 and the intermediate portion 39 when the stem seat 11 is in the unassembled condition thereof.

While a specific example of a workable stem seat 11 of this invention is hereinafter set forth, it is to be understood that this is not for the purpose of limitation of this invention as such dimensions are merely given as an example to compare with a prior art stem seat 11A which is subjected to the aforementioned wadding and compressive stresses during the assembled and stroked condition thereof.

In particular, for a typical device 10 wherein the housing member 16 has the portion 19 of the stepped bore 17 thereof formed with a diameter of approximately 0.230 of an inch and a length between the shoulder 21 and the outer end 15 of approximately 0.599 of an inch and a metallic stem 27 approximately 0.974 of an inch long and approximately 0.1258 of an inch in diameter, the resilient prior art stem seat 11A in its unassembled condition has an outside diameter of approximately 0.231 of an inch and an overall length of approximately 0.532 of an inch while the opening 29A had an overall length of approximately 0.470 of an inch with the larger diameter thereof being approximately 0.126 of an inch and the smaller diameter at the portion 31 thereof being approximately 0.085 of an inch and approximately 0.125 of an inch in length.

In contrast, the cylindrical resilient stem seat 11 of this invention for such a casing 16 has an outside diameter of approximately 0.231 of an inch and an overall length of approximately 0.484 of an inch. The opening 29 has an overall length of approximately 0.422 of an inch while the cylindrical portion 38 has a diameter of approximately 0.087 of an inch and the intermediate portion 39 has a diameter of approximately 0.126 of an inch and the section thereof that joins with the conical portion 40 is defined on a spherical radius of approximately 0.063 of an inch and the part thereof which joins with the portion 38 is formed on an angle of approximately 45° with the longitudinal axis of the stem seat 11.

The portion 40 of the opening 29 is substantially conical with the larger end thereof that joins with the portion 39 having a diameter of approximately 0.067 of an inch while the smaller portion adjacent the end 24 has a diameter of approximately 0.045 of an inch, the apex of the conical portion 40 being defined with a spherical radius of approximately 0.022 of an inch and thereby being hemispherical in configuration.

In the above example of the resilient stem seat 11 of this invention, the length of the portion 38 of the opening 29 from the end 25 to the end of the angle that defines the larger diameter of the intermediate portion 39 is approximately 0.125 of an inch and the length from the end 25 to a point 41 that defines the spherical radius for the intermediate portion 39 is approximately 0.175 of an inch. The length from the end 25 to the point 42 where the portion 40 of the opening 29 begins is approximately 0.228 of an inch whereas the length from the end 25 to the point 43 where the spherical radius for the hemispherical apex for the conical portion 40 begins is approximately 0.400 of an inch whereby it can be seen that the overall length of the portion 40 of the opening 29 is substantially the same as the combined lengths of the other portions 38 and 39 of the opening 29.

From the above, it can be seen that this invention provides an improved push type thermal device which will not have its resilient stem seat wad or wrinkle during the stroked condition thereof and the stem seat will remain substantially smooth and continuous in its outer surface in its stroked condition as illustrated in FIG. 9 whereby the cycling of the stem seat 11 of this invention between its stroked condition of FIG. 9 and its unstroked condition of FIG. 8 in the manner previously described will not cause the stem seat 11 to rupture and, thereby, wear out in the same manner if the same tended to wad in the manner of the prior known stem seat 11A previously described.

Therefore, it can be seen that this invention not only provides an improved push type thermal device and method of making the same, but also this invention provides an improved resilient stem seat and method of making the same.

While the forms and methods of this invention now preferred have been described and illustrated as required by the Patent Statute, it is to be understood that other forms and method steps can be utilized and still fall within the scope of the appended claims.

What is claimed is:

1. In a push type thermal device having a resilient stem seat provided with an opening in one end thereof and receiving an actuating stem in said opening that is adapted to reciprocate in a longitudinal direction in said opening in response to the thermal expansion and contraction of a charge of material in said device and only operatively acting on the other end of said stem seat in said longitudinal direction, the improvement wherein said stem seat has means for substantially preventing wadding of said stem seat during the stroking of said stem by the expansion of said charge of material.

2. A push type thermal device as set forth in claim 1 wherein said means of said stem seat provide said stem seat with a configuration thereof that initially has substantially the same length and outside shape between said ends in the unassembled condition thereof that the same has when in the fully stroked condition thereof.

3. A push type thermal device as set forth in claim 2 wherein said means of said stem seat comprises the configuration of said opening therein when said stem seat is in the unassembled condition thereof.

4. A push type thermal device as set forth in claim 3 wherein said configuration of said opening includes one portion thereof adjacent said other end of said stem seat that is substantially smaller in diameter than the diameter of said stem when said stem seat is in the unassembled condition thereof.

5. A push type thermal device as set forth in claim 4 wherein said configuration of said opening further includes another portion thereof adjacent said one end of said stem seat that is substantially smaller in diameter than the diameter of said stem when said stem seat is in the unassembled condition thereof, said configuration of said opening further including an intermediate portion of said opening that joins with said one portion and said other portion and has a diameter that is substantially the same as the diameter of said stem when said stem seat is in the unassembled condition thereof.

6. A push type thermal device as set forth in claim 5 wherein said one portion of said opening is substantially conical in configuration with the apex thereof adjacent said other end of said stem seat when said stem seat is in the unassembled condition thereof.

7. A push type thermal device as set forth in claim 6 wherein said apex is substantially hemispherical in configuration when said stem seat is in the unassembled condition thereof.

8. A push type thermal device as set forth in claim 6 wherein said other portion of said opening is substantially cylindrical in configuration when said stem seat is in the unassembled condition thereof.

9. A push type thermal device as set forth in claim 8 wherein said intermediate portion of said opening is substantially cup-shaped in configuration with a larger end thereof joining said other portion and a smaller end thereof joining said one portion when said stem seat is in the unassembled condition thereof.

10. A push type thermal device as set forth in claim 5 wherein the length of said one portion of said opening is substantially the same as the combined lengths of said other portion and said intermediate portion when said stem seat is in the unassembled condition thereof.

11. In a push type thermal device having a housing means provided with a chamber receiving a resilient stem seat that has an opening in one end thereof and receiving an actuating stem in said opening that is adapted to reciprocate in a longitudinal direction in said opening between a stroked condition and an unstroked condition in response to the thermal expansion and contraction of a charge of material in said device and only operatively acting on the other end of said stem seat in said longitudinal direction, the improvement wherein said stem seat has an unassembled length and outside shape that is substantially the same as the length and outside shape of said stem seat in the fully stroked condition of said device when said stem seat is in the assembled condition thereof in said chamber.

12. In a push type thermal device having a housing means provided with a substantially cylindrical chamber receiving a substantially cylindrical resilient stem seat that has an opening in one end thereof and receiving an actuating stem in said opening that is adapted to reciprocate in a longitudinal direction in said opening between a stroked condition and an unstroked condition in response to the thermal expansion and contraction of a charge of material in said device and only operatively acting on the other end of said stem seat in said longitudinal direction, the improvement wherein said stem seat has a substantially smooth and continuous cylindrical sidewall in its stroked condition and its unstroked condition.

13. In a method of making a push type thermal device having a resilient stem seat provided with an opening in one end thereof and receiving an actuating stem in said opening that is adapted to reciprocate in a longitudinal direction in said opening in response to the thermal expansion and contraction of a charge of material in said device and only operatively acting on the other end of said stem seat in said longitudinal direction, the improvement comprising the step of forming said stem seat to have means for substantially preventing wadding of said stem seat during the stroking of said stem by the expansion of said charge of material.

14. A method of making a push type thermal device as set forth in claim 13 wherein said step of forming said stem seat with said means comprises the step of forming said stem seat with a configuration thereof that initially has substantially the same length and outside shape between said ends in the unassembled condition thereof that the same has when in the fully stroked condition thereof.

15. A method of making a push type thermal device as set forth in claim 14 wherein said step of forming said stem seat with said means comprises the step of forming the configuration of said opening therein with a particular configuration when said stem seat is in the unassembled condition thereof.

16. A method of making a push type thermal device as set forth in claim 15 wherein said step of forming said configuration of said opening includes the step of forming one portion of said opening adjacent said other end of said stem seat to be substantially smaller in diameter than the diameter of said stem when said stem seat is in the unassembled condition thereof.

17. A method of making a push type thermal device as set forth in claim 16 wherein said step of forming said configuration of said opening further includes the steps of forming another portion of said opening adjacent said one end of said stem seat to be substantially smaller in diameter than the diameter of said stem when said stem seat is in the unassembled condition thereof, and forming said configuration of said opening with an intermediate portion of said opening that joins with said one portion and said other portion and has a diameter that is substantially the same as the diameter of said stem when said stem seat is in the unassembled condition thereof.

18. A method of making a push type thermal device as set forth in claim 17 and including the step of forming said one portion of said opening to be substantially conical in configuration with the apex thereof adjacent said other end of said stem seat when said stem seat is in the unassembled condition thereof.

19. A method of making a push type thermal device as set forth in claim 18 and including the step of forming said apex to be substantially hemispherical in configuration when said stem seat is in the unassembled condition thereof.

20. A method of making a push type thermal device as set forth in claim 18 and including the step of forming said other portion of said opening to be substantially cylindrical in configuration when said stem seat is in the unassembled condition thereof.

21. A method of making a push type thermal device as set forth in claim 20 and including the step of forming said intermediate portion of said opening to be substantially cup-shaped in configuration with a larger end thereof joining said other portion and a smaller end thereof joining said one portion when said stem seat is in the unassembled condition thereof.

22. A method of making a push type thermal device as set forth in claim 17 and including the step of forming the length of said one portion of said opening to be substantially the same as the combined lengths of said other portion and said intermediate portion when said stem seat is in the unassembled condition thereof.

23. In a method of making a push type thermal device having a housing means provided with a chamber receiving a resilient stem seat that has an opening in one end thereof and receiving an actuating stem in said opening that is adapted to reciprocate in a longitudinal direction in said opening between a stroked condition and an unstroked condition in response to the thermal expansion and contraction of a charge of material in said device and only operatively acting on the other end of said stem seat in said longitudinal direction, the improvement comprising the step of forming said stem seat to have an unassembled length and outside shape that is substantially the same as the length and outside shape of said stem seat in the fully stroked condition of said device when said stem seat is in the assembled condition thereof in said chamber.

24. In a method of making a push type thermal device having a housing means provided with a substantially cylindrical chamber receiving a substantially cylindrical resilient stem seat that has an opening in one end thereof and receiving an actuating stem in said opening that is adapted to reciprocate in a longitudinal direction in said opening between a stroked condition and an unstroked condition in response to the thermal expansion and contraction of a charge of material in said device and only operatively acting on the other end of said stem seat in said longitudinal direction, the improvement comprising the step of forming said stem seat to have a substantially smooth and continuous cylindrical sidewall in its stroked condition and its unstroked condition.

25. In a resilient stem seat for a push type thermal device and being provided with an opening in one end thereof for receiving an actuating stem that is adapted to be reciprocated in a longitudinal direction in said opening in response to the thermal expansion and contraction of a charge of material in said device and adapted to be only operatively acting on the other end of said stem seat in said longitudinal direction, the improvement wherein said stem seat has means for substantially preventing wadding of said stem seat during the stroking of said stem by the expansion of said charge of material.

26. A stem seat for a push type thermal device as set forth in claim 25 wherein said means of said stem seat provides said stem seat with a configuration thereof that initially has substantially the same length and outside shape between said ends in the unassembled condition thereof that the same has when in the fully stroked condition thereof.

27. A stem seat for a push type thermal device as set forth in claim 26 wherein said means of said stem seat comprises the configuration of said opening therein when said stem seat is in the unassembled condition thereof.

28. A stem seat for a push type thermal device as set forth in claim 27 wherein said configuration of said opening includes one portion thereof adjacent said other end of said stem seat that is substantially smaller in diameter than the diameter of said stem when said stem seat is in the unassembled condition thereof.

29. A stem seat for a push type thermal device as set forth in claim 28 wherein said configuration of said opening further includes another portion thereof adjacent said one end of said stem seat that is substantially smaller in diameter than the diameter of said stem when said stem seat is in the unassembled condition thereof, said configuration of said opening further including an intermediate portion of said opening that joins with said one portion and said other portion and has a diameter that is substantially the same as the diameter of said stem when said stem seat is in the unassembled condition thereof.

30. A stem seat for a push type thermal device as set forth in claim 29 wherein said one portion of said opening is substantially conical in configuration with the apex thereof adjacent said other end of said stem seat when said stem seat is in the unassembled condition thereof.

31. A stem seat for a push type thermal device as set forth in claim 30 wherein said apex is substantially hemispherical in configuration when said stem seat is in the unassembled condition thereof.

32. A stem seat for a push type thermal device as set forth in claim 30 wherein said other portion of said opening is substantially cylindrical in configuration when said stem seat is in the unassembled condition thereof.

33. A stem seat for a push type thermal device as set forth in claim 32 wherein said intermediate portion of said opening is substantially cup-shaped in configuration with a larger end thereof joining said other portion and a smaller end thereof joining said one portion when said stem seat is in the unassembled condition thereof.

34. A stem seat for a push type thermal device as set forth in claim 29 wherein the length of said one portion of said opening is substantially the same as the combined length of said other portion and said intermediate portion when said stem seat is in the unassembled condition thereof.

35. In a resilient stem seat for a push type thermal device having a housing means provided with a chamber for receiving said resilient stem seat that has an opening in one end thereof and adapted to receive an actuating stem in said opening that is adapted to reciprocate in a longitudinal direction in said opening between a stroked condition and an unstroked condition in response to the thermal expansion and contraction of a charge of material adapted to be disposed in said device and only operatively act on the oher end of said stem seat in said longitudinal direction, the improvement wherein said stem seat has an unassembled length and outside shape that is substantially the same as the length and outside shape of said stem seat in the fully stroked condition of said device when said stem seat is in the assembled condition thereof in said chamber.

36. In a substantially cylindrical resilient stem seat for a push type thermal device having a housing means provided with a substantially cylindrical chamber for receiving said resilient stem seat that has an opening in one end thereof and adapted to receive an actuating stem in said opening that is adapted to reciprocate in a longitudinal direction in said opening between a stroked condition and an unstroked condition in response to the thermal expansion and contraction of a charge of material adapted to be disposed in said device and only operatively act on the other end of said stem seat in said longitudinal direction, the improvement wherein said stem seat has a substantially smooth and continuous cylindrical sidewall in its stroked condition and its unstroked condition.

37. In a method of making a resilient stem seat for a push type thermal device and being provided with an opening in one end thereof for receiving an actuating stem that is adapted to be reciprocated in a longitudinal direction in said opening in response to the thermal expansion and contraction of a charge of material in said device and adapted to be only operatively acting on the other end of said stem seat in said longitudinal direction, the improvement comprising the step of forming said stem seat to have means for substantially preventing wadding of said stem seat during the stroking of said stem by the expansion of said charge of material.

38. A method of making a stem seat for a push type thermal device as set forth in claim 37 wherein said step of forming said stem seat with said means comprises the step of forming said stem seat with a configuration thereof that initially has substantially the same length and outside shape between said ends in the unassembled condition thereof that the same has when in the fully stroked condition thereof.

39. A method of making a stem seat for a push type thermal device as set forth in claim 38 wherein said step of forming said stem seat with said means comprises the step of forming the configuration of said opening therein with a particular configuration when said stem seat is in the unassembled condition thereof.

40. A method of making a stem seat for a push type thermal device as set forth in claim 39 wherein said step of forming said configuration of said opening includes the step of forming one portion of said opening adjacent said other end of said stem seat to be substantially smaller in diameter than the diameter of said stem when said stem seat is in the unassembled condition thereof.

41. A method of making a stem seat for a push type thermal device as set forth in claim 40 wherein said step of forming said configuration of said opening further includes the steps of forming another portion of said opening adjacent said one end of said stem seat to be substantially smaller in diameter than the diameter of said stem when said stem seat is in the unassembled condition thereof and forming said configuration of said opening with an intermediate portion of said opening that joins with said one portion and said other portion and has a diameter that is substantially the same as the diameter of said stem when said stem seat is in the unassembled condition thereof.

42. A method of making a stem seat for a push type thermal device as set forth in claim 41 and including the step of forming said one portion of said opening to be substantially conical in configuration with the apex thereof adjacent said other end of said stem seat when said stem seat is in the unassembled condition thereof.

43. A method of making a stem seat for a push type thermal device as set forth in claim 42 and including the step of forming said apex to be substantially hemispherical in configuration when said stem seat is in the unassembled condition thereof.

44. A method of making a stem seat for a push type thermal device as set forth in claim 42 and including the step of forming said other portion of said opening to be substantially cylindrical in configuration when said stem seat is in the unassembled condition thereof.

45. A method of making a stem seat for a push type thermal device as set forth in claim 44 and including the step of forming said intermediate portion of said opening to be substantially cup-shaped in configuration with a larger end thereof joining said other portion and a smaller end thereof joining said one portion when said stem seat is in the unassembled condition thereof.

46. A method of making a stem seat for a push type thermal device as set forth in claim 41 and including the step of forming the length of said one portion of said opening to be substantially the same as the combined length of said other portion and said intermediate portion when said stem seat is in the unassembled condition thereof.

47. In a method of making a resilient stem seat for a push type thermal device having a housing means provided with a chamber for receiving said resilient stem seat that has an opening in one end thereof and adapted to receive an actuating stem in said opening that is adapted to reciprocate in a longitudinal direction in said opening between a stroked condition and an unstroked condition in response to the thermal expansion and contraction of a charge of material adapted to be disposed in said device and only operatively act on the other end of said stem seat in said longitudinal direction, the improvement comprising the step of forming said stem seat to have an unassembled length and outside shape that is substantially the same as the length and outside shape of said stem seat in the fully stroked condition of said device when said stem seat is in the assembled condition thereof in said chamber.

48. In a method of making a substantially cylindrical resilient stem seat for a push type thermal device having a housing means provided with a substantially cylindrical chamber for receiving said resilient stem seat that has an opening in one end thereof and adapted to receive an actuating stem in said opening that is adapted to reciprocate in a longitudinal direction in said opening between a stroked condition and an unstroked condition in response to the thermal expansion and contraction of a charge of material adapted to be disposed in said device and only operatively act on the other end of said stem seat in said longitudinal direction, the improvement comprising the step of forming said stem seat to have a substantially smooth and continuous cylindrical sidewall in its stroked condition and its unstroked condition.

* * * * *